United States Patent
Groell et al.

(10) Patent No.: US 7,546,690 B2
(45) Date of Patent: Jun. 16, 2009

(54) PROBE SYSTEM AND METHOD FOR OPERATING A PROBE SYSTEM

(75) Inventors: Klaus Groell, Waging am See (DE); Christian Eisenberger, Ruhpolding (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/942,454

(22) Filed: Nov. 19, 2007

(65) Prior Publication Data

US 2008/0110039 A1 May 15, 2008

(30) Foreign Application Priority Data

Nov. 22, 2006 (DE) .................. 10 2006 054 978

(51) Int. Cl.
G01B 5/012 (2006.01)
(52) U.S. Cl. .......................... 33/558; 33/556
(58) Field of Classification Search ............... 33/503, 33/556, 557, 558, 559, 560, 561
See application file for complete search history.

(56) References Cited

U.S. PATENT DOCUMENTS

| 5,012,591 | A  | * | 5/1991  | Asakawa .................. 33/561 |
| 5,056,235 | A  | * | 10/1991 | Thomas .................... 33/503 |
| 6,301,796 | B1 | * | 10/2001 | Cresson .................... 33/556 |
| 6,839,563 | B1 | * | 1/2005  | Kirby et al. ............... 33/503 |
| 6,951,060 | B2 |   | 10/2005 | Groell |
| 7,350,307 | B2 | * | 4/2008  | Carli ........................ 33/503 |
| 7,486,195 | B2 | * | 2/2009  | Collingwood et al. ..... 33/503 |
| 2007/0068024 | A1 | * | 3/2007 | Fuge et al. ................ 33/559 |
| 2007/0245584 | A1 | * | 10/2007 | Hagl et al. ................ 33/561 |
| 2009/0025243 | A1 | * | 1/2009 | Prestidge et al. ......... 33/559 |

FOREIGN PATENT DOCUMENTS

DE 103 03 551 8/2004

* cited by examiner

*Primary Examiner*—G. Bradley Bennett
(74) *Attorney, Agent, or Firm*—Kenyon & Kenyon LLP

(57) ABSTRACT

A probe system includes a probe head and a transceiver element. The probe head has a feeler and a sensor element. Moreover, the probe head is able to be transferred from a passive state to an active state, a sensor signal being able to be generated by the sensor element in the active state. The probe head and the transceiver element are configured such that a wireless data transmission is possible between them in a manner that the sensor signal is convertible in the probe head into a switching signal which is transmittable from the probe head to the transceiver element. During the active state, a control command is able to be transmitted continuously in wireless fashion by the transceiver element, the active state of the probe head being able to be maintained by the continuously transmitted control command. Furthermore, the switching signal is able to be transmitted without collision with respect to the transmission of the control command.

20 Claims, 2 Drawing Sheets

US 7,546,690 B2

PROBE SYSTEM AND METHOD FOR OPERATING A PROBE SYSTEM

CROSS-REFERENCE TO RELATED APPLICATIONS

The present application claims priority to Application No. 10 2006 054 978.3, filed in the Federal Republic of Germany on Nov. 11, 2006, which is expressly incorporated herein in its entirety by reference thereto.

FIELD OF THE INVENTION

The present invention relates to a probe system and to a method for operating a probe system. The probe system may include a probe head having a feeler, a transceiver element, and a wireless data transmission arranged between the probe head and the transceiver element.

BACKGROUND INFORMATION

A probe system generally includes a mobile probe head and a stationary transceiver element. The probe head in the form of a momentary-contact switch having a deflectable feeler, which outputs a switching signal in response to a deflection out of its rest position or upon a contact of the feeler, is used, in particular, for determining the position of workpieces that are clamped in machines, e.g., machine tools, that process material. In this context, the rest position of the feeler is understood to be a position in which the feeler has no contact with the workpiece to be probe-contacted. Upon contact of the feeler with the workpiece, the feeler is deflected out of its rest position, and an electrical sensor signal is generated by a suitable transducer if the deflection exceeds a specified probe threshold. The electrical sensor signal is frequently converted into an infrared signal, so that a contactless and wireless signal transmission to the transceiver element of the probe system is thus achieved.

The infrared signals are converted again into electrical signals in this transceiver element. The transceiver element of the probe system is connected to an evaluation unit, to which the electrical signals are relayed and evaluated and ultimately made available, for example, to the control of the machine tool. The position of the workpiece to be measured can be determined based on the measured position of the machine tool part in question.

German Published Patent Application No. 103 03 551 describes a probe system of the type indicated above, in which a start signal is transmitted by a transmit element to a probe head, which triggers the preparedness of the probe head for the measuring operation. The probe head, usually operated with a battery, requires a comparatively great amount of electrical energy in this state. For instance, in this active state, the probe head is repeatedly driven close up to various contours of a workpiece, so that in response to any contact with the workpiece, the feeler triggers corresponding switching signals. After the measuring process is concluded, the probe head must be deactivated again by transmitting a control command, and returned to a stand-by state economizing on energy.

In certain conventional probe systems, after a predefined time span, the probe head is returned to the stand-by state by a time-out function.

Thus, certain conventional probe systems have the disadvantage that the probe heads are frequently in the active state of the measuring operation for an unnecessarily long time, and therefore needlessly consume a great amount of electrical energy.

SUMMARY

Example embodiments of the present invention provide a probe system of the type indicated above and a method for its operation which, on the whole, permit reduced energy consumption by the probe head.

According to example embodiments of the present invention, the probe system includes a probe head and a transceiver element. The probe head has a feeler and a sensor element, the probe head being transferable from a passive state to an active state prior to the actual measuring operation. In the active state of the probe head, a sensor signal is able to be generated by the sensor element in the probe head in response to contact of the feeler with a workpiece. The probe head and the transceiver element are configured such that a wireless data transmission is possible between them in a manner that in the active state, the sensor signal is convertible in the probe head into a switching signal which, in the active state, is transmittable in wireless fashion from the probe head to the transceiver element. During the active state, a control command is continually transmittable in wireless fashion from the transceiver element to the probe head, whereby the active state of the probe head, triggered by the reception of the control command continually transmitted by the transceiver element, can be maintained. In this context, the transmission of the switching signal is configured, that is, the probe head and the transceiver element are configured, so that this transmission is executable without collision with respect to the transmission of the control command.

It should be understood that a passive state is also, for example, a stand-by state or sleep state of the probe head.

For example, the sensor elements may be arranged as pressure-sensitive sensor elements. In this instance, because of pressure changes at the support points of the feeler, a sensor signal is generated in the probe head virtually without noticeable deflection travel of the sensor elements. Alternatively, optically acting sensor elements may also be used, in which the incidence of light on an optoelectronic component in the probe head is altered by optical components at the feeler, so that in this manner a sensor signal is generated.

It should be understood that without collision means that the transmission of the switching signal is not disturbed by the continual transmission of the control command. In particular, proper functioning of the probe system is provided, even when a switching signal coincides in time with a control command.

Electromagnetic waves, e.g., infrared light, may be used for the wireless data transmission. For wireless data transmission using infrared light, infrared signals are transmittable by an infrared light source disposed at the probe head and at the transceiver element, respectively, and are convertible into electrical signals by optoelectronic receivers disposed at the transceiver element and at the probe head, respectively.

The probe system may be configured such that the switching signal transmitted from the probe head is able to be received simultaneously with the transmission of the control command by the transceiver element.

The probe head and the transceiver element may be configured such that a first transmission channel is usable for transmitting the control command, and a second transmission channel is usable for transmitting the switching signal. Both the control command and the switching signal may be transmittable using carrier frequencies, the carrier frequency for transmitting the control command being different from the carrier frequency for transmitting the switching signal. Particularly with regard to reducing the energy demand in the probe head, it may be provided that the carrier frequency for transmitting the control command is lower than the carrier frequency for transmitting the switching signal.

The control command and/or the switching signal may include at least one bit sequence, high bits being produced by the enveloping curve of a plurality of electromagnetic signals recurring with a carrier frequency, so that the bits thus include pulses modulated with a carrier frequency.

In a simplest case, the nonstop control command may have one continuously transmitted high bit. Alternatively, the nonstop control command may also have continuously, repeatedly transmitted bit sequences, possibly separated from each other by brief pauses. These pauses are less than 10 s, e.g., less than 1 s, or less than 0.1 s. The pauses are timed to be short enough that the probe head cannot fall back into the passive state during this time.

The probe head and the transceiver element may be configured such that the control command and the switching signal are able to be transmitted with the aid of a time-division multiplex method. Using the time-division multiplex method, both the control commands and the switching signals are transmitted via one and the same channel. In the time-division multiplex method, the time is subdivided into small segments in which the channel may be used either by the probe head or by the transceiver element for transmitting.

Accordingly, the freedom from collision may be provided by the use of different channels for the data transmission or by the use of the time-division multiplex method.

The sensor signal may be able to be generated in the probe head even while the control command is being received, i.e., simultaneously with the reception of the control command. Particularly if a time-division multiplex method is used, with the aid of a timer in the probe head, initially a time difference may be determined between the generating of the sensor signal and the transmission of a switching signal, and the value of this time difference may be transmitted to the transceiver element to permit a correction process. In the sequential electronics, e.g., a numerical control, the exact position at the instant of probe contact may be calculated with the aid of the correction process, based on the time difference and the movement speed of the probe head.

The probe head and the transceiver element may be configured such that the probe head is able to be transferred from the passive state to the active state by transmission of the control command. Accordingly, a command, e.g., the control command, is used initially to transfer the probe head to the active state, and then to keep it in the active state. However a probe system may be provided in which initially a first control command is transmitted to transfer the probe head from the passive state to the active state, and a second control command is transmitted to keep the probe head in the active state.

A method of operating a probe system includes: transferring of the probe head from a passive state to an active state prior to the measuring operation; continuously, wirelessly transmitting a control command from the transceiver element to the probe head during the active state, whereby the active state of the probe head, triggered by the reception of the control command continuously transmitted by the transceiver element, is maintained; generating a sensor signal in the active state as a result of contact of the feeler with a workpiece, and converting the sensor signal into a switching signal with the aid of electronics in the probe head; wirelessly transmitting the switching signal from the probe head to the transceiver element in a manner that it is accomplished without collision with respect to the transmission of the control command.

The continuous control command may also be transmitted by the transceiver element when the probe head is still in its passive state. The continuous control command initially triggers the transfer of the probe head from the passive state to the active state, the control command thereupon maintaining the active state of the probe head, triggered by the further reception of the continuously transmitted control command of the same type.

Further details and features of example embodiments of the present invention are described in more detail below with reference to the appended Figures.

DETAILED DESCRIPTION

Figure 1:
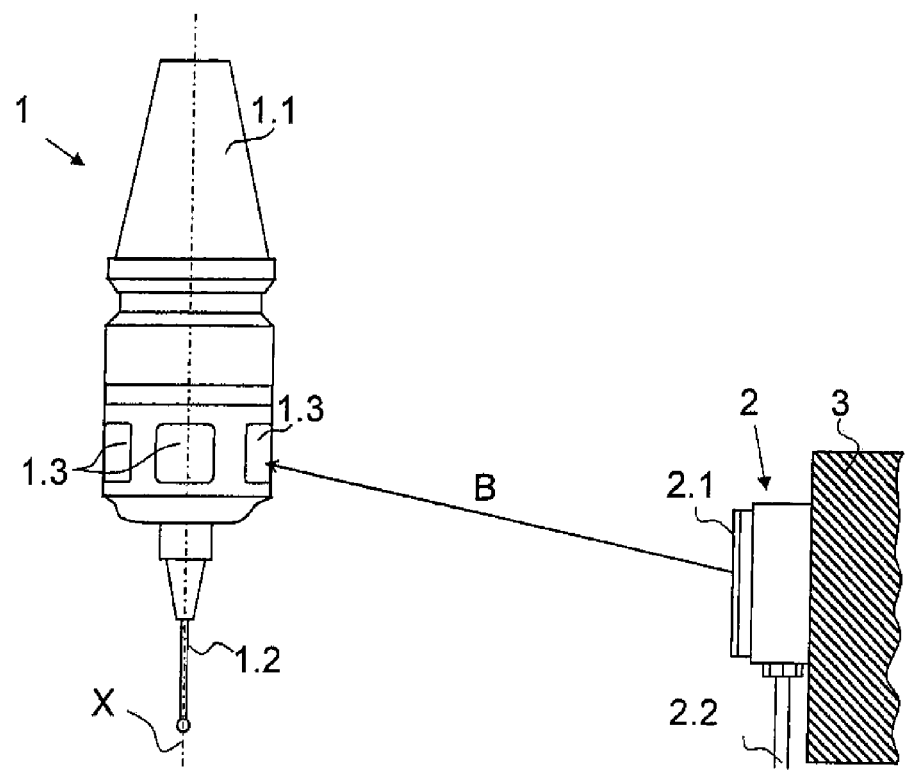
FIG. 1 illustrates a probe system in a lateral view during activation of the probe head.

FIG. 1 illustrates a probe system that includes a probe head 1 and a transceiver element 2. Probe head 1 may be clamped into a spindle of a machine tool by a clamping cone 1.1. Longitudinal axis X of probe head 1 represents the center axis of clamping cone 1.1. Parallel and concentrically with respect to longitudinal axis X, a cylindrical feeler 1.2, having a probe-contact sphere at one end, is provided on probe head 1.

Figure 2:
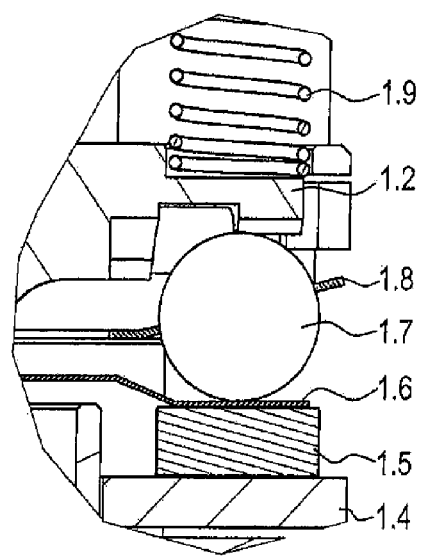
FIG. 2 is a detail view illustrating a sensor element in the probe head.

FIG. 2 is a partial view of the interior of probe head 1. Arranged on a printed circuit board 1.4 are a total of three pressure-sensitive sensor elements 1.5, of which only one is illustrated in the view in FIG. 2. Disposed on the surface of each sensor element 1.5 is a diaphragm 1.6, which in each case is touched by a sphere 1.7, spheres 1.7 being fixed exactly at a predetermined position relative to sensor elements 1.5 by a holder 1.8. An arm of feeler 1.2, prestressed in each case by a spring 1.9, rests on each sphere 1.7. A battery is disposed in probe head 1 to supply probe head 1 with energy.

Figure 3:
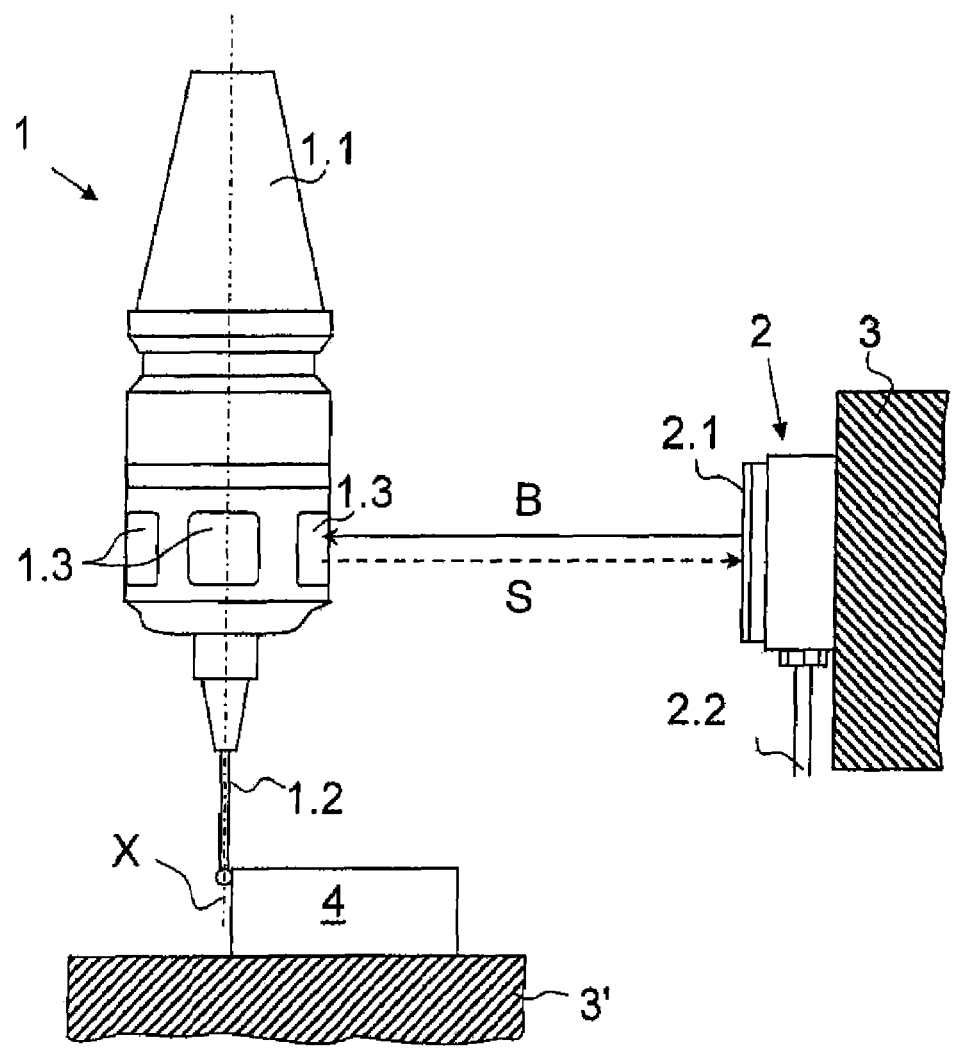
FIG. 3 illustrates the probe system in which the probe head, i.e., its feeler, is contacting a workpiece.

Probe head 1 also has transmit/receive units 1.3 which are staggered over the periphery of probe head 1, as illustrated in FIGS. 1 and 3. In the example illustrated, six transmit/receive units 1.3 are provided on probe head 1, each offset by 60° along a circumferential line on probe head 1.

In the example illustrated, transceiver element 2 is secured to a stationary component 3 of the machine tool, and has a window 2.1 that is transparent to infrared light and behind which an infrared light source and an optoelectronic receiver are arranged. Transceiver element 2 is connected by a multi-core cable 2.2 to the network for its energy supply, and moreover is electrically connected to a sequential electronics, i.e., to a numerical control of the machine tool.

Probe head 1 and transceiver element 2 are configured such that a wireless data transmission is possible between them, in particular, probe head 1 and transceiver element 2 are able to both transmit and receive infrared signals. An infrared signal is emitted from probe head 1 with the aid of infrared light sources assigned to transmit/receive units 1.3. Irradiated infrared signals are able to be received in transmit/receive units 1.3 of probe head 1, and converted into electrical signals by optoelectronic receivers.

A control command B in the form of infrared light pulses is continuously transmitted by the infrared light source of transceiver element 2. In this context, control command B includes a defined bit sequence. The infrared light pulses which make up control command B are modulated with a carrier frequency $f_B$, e.g., 1024 Hz, for the data transmission. Even if transceiver element 2 is connected to a numerical control of a machine tool, the transmission of control command B may be initiated without assistance of the numerical control if transceiver element 2 is suitably configured. For example, control command B may be transmitted automatically as soon as the system voltage is applied to transceiver element 2. On one hand, this can reduce the cycles to be processed by the numerical control, because transceiver element 2 transmits of its own accord. On the other hand, a probe system may thus be created whose compatibility with different numerical controls may be increased or simplified.

Probe head 1 may be supported in a tool holding magazine of a machine tool, it being in a passive state, for example, a stand-by state or sleep state, in which a contact of feeler 1.2 would not trigger a reaction in probe head 1. To perform measuring tasks, probe head 1 is automatically taken out of the magazine and clamped into the spindle of the machine tool. In this process, as soon as probe head 1, which is still in the passive state, comes into the transmission range of transceiver element 2, control command B is transmitted wirelessly from transceiver element 2 to probe head 1. Control command B is thus received by probe head 1 in the transmission range. Probe head 1 is transferred from the passive state to an active state by the reception of control command B, so that a measuring operation may be started.

During this measuring operation, probe head 1 is moved within the machining space of the machine tool, or is swiveled about an axis aligned orthogonally with respect to longitudinal axis X. Even while probe head 1 is in this active state, control command B is continuously transmitted by transceiver element 2. The reception of continuously transmitted control command B in probe head 1 keeps it in the active state, thus in measuring operation.

FIG. 3 illustrates the situation in which feeler 1.2 is contacting a workpiece 4 which is secured on a mounting table 3' of the machine tool. In the active state of probe head 1, sensor elements 1.5 generate a sensor signal when, for example, feeler 1.2 touches the outer contour of workpiece 4 to be measured. The sensor signal is converted by electronic components on printed circuit board 1.4 into a switching signal S. This switching signal S is generated in the form of an infrared signal including infrared light pulses, the infrared light pulses being transmitted according to a predefined bit sequence. In so doing, the transmitted bit sequences are modulated with a carrier frequency $f_S$, e.g., 5 MHz. Thus, when feeler 1.2 touches workpiece 4, probe head 1 transmits a corresponding switching signal S, so that switching signal S is transmittable from probe head 1 to transceiver element 2. At the same time, transceiver element 2 continues to transmit control command B.

Transceiver element 2 is configured so that switching signal S having carrier frequency $f_S$ may be received even when, as in the present case, control command B having carrier frequency $f_B$ continues to be transmitted by it nonstop. Therefore, switching signal S is thus able to be transmitted without collision with respect to the transmission of control command B. Switching signal S, received by transceiver element 2 in the form of infrared light pulses, is converted into electrical signals and conditioned. The conditioned electrical signals arrive via cable 2.2 at a stationary sequential electronics, where they are further processed. The sequential electronics immediately trigger a stop of the machine tool, so that probe head 1 is no longer moved relative to workpiece 4. Thereupon, the position at which the workpiece is contacted is determined. Generally, machine tools have precise measuring devices which determine the spindle position, so that these measured values are used for determining the contact position.

If the intention is to end the measuring operation, probe head 1 is automatically removed from the spindle and transported into the tool holding magazine. There, it is outside of the transmission range of control command B, which is still continuously transmitted by transceiver element 2. Since probe head 1 is no longer able to receive control command B, probe head 1 can no longer be kept in the active state, and therefore falls back automatically into the passive state in which probe head 1 requires substantially less electrical energy, so that the service life of the battery is increased. Consequently, probe head 1 is only in the active state for as long as it is in the machining space of the machine tool, so that the average energy consumption of probe head 1 is reduced considerably.

Alternatively, however, the numerical control of the machine tool may also trigger control command B, in that a high signal is transmitted from the numerical control to transceiver element 2 via cable 2.2. The high signal, starting from its reception in transceiver element 2, then causes control command B to be transmitted continuously by transceiver element 2.

Control command B and switching signal S may be transmitted with the aid of a time-division multiplex method.

In this instance, only one specific, ever recurrent, first period of time is assigned to transceiver element 2 for transmitting continuous control command B, and a second, ever recurrent period of time is assigned to probe head 1 for transmitting switching signal S. Transceiver element 2 and probe head 1 are in each case only able to transmit control command B or switching signal S in the period of time provided for them, and thus the use of two transmission channels is not necessary. The length of the periods of time may be each case 1 ms. Probe head 1 is configured such that it still remains in the active state, e.g., for 4 ms, after receiving last control command B.

When feeler 1.2 touches workpiece 4 in the active state, initially sensor elements 1.5 generate a sensor signal that is converted into a switching signal S for the wireless transmission from probe head 1 to transceiver element 2.

If the instant of the transmission falls in the period of time assigned to probe head 1 for transmitting, probe head 1 transmits switching signal S to transceiver element 2 without collision, transceiver element 2 not transmitting control command A precisely in this period of time.

However, if the instant of the contact of workpiece 4 by feeler 1.2, or of the generation of switching signal S falls in the period of time which is assigned to transceiver element 2 for transmitting control command B, then the transmission of switching signal S is held back. At the same time, a timer in probe head 1 records a time $t_1$ at which switching signal S would have been ready for transmission.

As soon as the transmission of control command B is interrupted in transceiver element 2, the transmission of switching signal S is prepared by probe head 1, and at the same time, current time $t_2$ is recorded by the timer in probe head 1. A time difference $\Delta t$ is determined, which is calculated from the two recorded times ($\Delta t = t_2 - t_1$). In this exemplary embodiment, time difference $\Delta t$ from measured times $t_1$, $t_2$ is a maximum of 1.1 ms. Switching signal S, together with the value of time difference $\Delta t$, is transmitted immediately by probe head 1. Switching signal S is received by transceiver element 2 in a manner free of collision, so that—as in the above-described exemplary embodiment—a stop of the machine tool is triggered. The instantaneous position coordinates of the spindle are calculated in the control of the machine tool. To increase the accuracy, time difference $\Delta t$ is used in a correction process by calculating the contact position, taking the movement speed of the spindle, time difference $\Delta t$ and the measured position coordinates into account.

Alternatively, numerical control may be configured so that it takes a constant time delay of, e.g., 2 ms, into account in the correction process. If transceiver element 2 receives a value for time difference $\Delta t$ of 0.5 ms, for example, transceiver element 2 holds back the transmission of the conditioned, electrical signals via cable 2.2 to a stationary numerical control for 1.5 ms, so that the predefined constant time delay agrees with the actual time delay in the correction process. In addition, still further delay times may also be taken into consideration by transceiver element 2, e.g., transmission times for the signal transmission from transceiver element 2 to the numerical control, so that the hold-back time may be reduced accordingly.

The requisite, predefined, constant time delay is determined during an initial calibration of the entire system.

What is claimed is:

1. A probe system, comprising
a probe head including a feeler and a sensor element, a state of the probe head changeable from a passive state to an active state, the sensor element, in the active state, configured to generate a sensor signal as a result of contact of the feeler with a workpiece; and
a transceiver element;
wherein the probe head and the transceiver element are configured for wireless data transmission with each other;
wherein, in the active state, the sensor signal is convertible in the probe head into a switching signal transmittable in wireless fashion from the probe head to the transceiver element;
wherein the transceiver element is configured to continuously, wirelessly transmit, during the active state, a control command to maintain the active state of the probe head, the active state of the probe head triggered by reception of the control command by the probe head; and
wherein the switching signal is transmittable without collision with respect to the transmission of the control command.

2. The probe system according to claim 1, wherein the switching signal is receivable by the transceiver element simultaneously with the transmission of the control command.

3. The probe system according to claim 2, wherein the probe head and the transceiver element are configured such that a first transmission channel is usable for transmission of the control command and a second transmission channel is usable for transmission of the switching signal.

4. The probe system according to claim 2, wherein both the control command and the switching signal are transmittable using carrier frequencies, a carrier frequency for transmission of the control command being different from a carrier frequency for transmission of the switching signal.

5. The probe system according to claim 4, wherein the carrier frequency for transmission of the control command is lower than the carrier frequency for transmission of the switching signal (S).

6. The probe system according to claim 1, wherein the control command and the switching signal are transmittable by a time-division multiplex method.

7. The probe system according to claim 1, wherein the probe head is configured to generate the sensor signal while the control command is being received.

8. The probe system according to claim 6, wherein the probe head includes a timer configured to determine a time difference between generation of the sensor signal and the transmission of the switching signal, the time difference transmittable to the transceiver element to permit a correction process.

9. The probe system according to claim 1, wherein the state of the probe head changeable from the passive state to the active state by transmission of the control command.

10. The probe system according to claim 1, wherein at least one of (a) the sensor signal and (b) the switching signal includes an infrared signal.

11. A method for operating a probe system having a probe head and a transceiver element, the probe head including a feeler and a sensor element, comprising:
changing a state of the probe head from a passive state to an active state;
continuously, wirelessly transmitting a control command by the transceiver element during the active state to maintain the active state of the probe head, the active state of the probe head triggered by reception of the continuously transmitted control command;
generating a sensor signal by the sensor element in the active state as a result of contact of the feeler with a workpiece and converting the sensor signal into a switching signal; and
wirelessly transmitting the switching signal from the probe head to the transceiver element in a manner without collision with respect to the transmission of the control command.

12. The method according to claim 11, further comprising receiving, by the transceiver element, the switching signal transmitted by the probe head simultaneously with the transmission of the control command.

13. The method according to claim 11, wherein the control command is transmitted in the control command transmitting step in a first transmission channel, and the switching signal is transmitted in the switching signal transmitting step in a second transmission channel.

14. The method according to claim 12, wherein both the control command and the switching signal are transmitted in the respective transmitting steps using carrier frequencies, a carrier frequency for transmission of the control command being different from a carrier frequency for transmission of the switching signal.

15. The method according to claim 14, wherein the carrier frequency for transmission of the control command is lower than the carrier frequency for transmission of the switching signal.

16. The method according to claim 11, wherein the control command and the switching signal are transmitted in the respective transmitting steps by a time-division multiplex method.

17. The method according to claim 11, wherein the sensor signal is generated in the sensor signal generating step during reception of the control command.

18. The method according to claim 16, further comprising:
determining, in the probe head, a time difference between generating the sensor signal and the transmission of the switching signal; and
transmitting the time difference to the transceiver element to perform a correction process.

19. The method according to claim 11, wherein the state of the probe head changed from the passive state to the active state in the changing step by the wireless transmission of the control command from the transceiver element during the passive state of the probe head.

20. The method according to claim 11, wherein at least one of (a) the wireless transmission of the control command and (b) the wireless transmission of the switching signal includes wireless transmission via infrared signals.

\* \* \* \* \*